United States Patent [19]

Schimion et al.

[11] Patent Number: 5,527,017
[45] Date of Patent: Jun. 18, 1996

[54] APPARATUS FOR DISSOLVING ZINC BY MEANS OF ACID-CONTAINING LIQUID ELECTROLYTES

[75] Inventors: Werner Schimion; Ulrich Gläsker, both of Hilchenbach; Herbert Heider, Kreuztal, all of Germany

[73] Assignee: SMS Schloemann-Siemag Aktiengesellschaft, Düsseldorf, Germany

[21] Appl. No.: 345,503

[22] Filed: Nov. 28, 1994

[30] Foreign Application Priority Data

Nov. 27, 1993 [DE] Germany ............ 43 40 439.1

[51] Int. Cl.⁶ ................................ C22B 3/02
[52] U.S. Cl. ............ 266/91; 266/101; 422/167
[58] Field of Search ............ 266/91, 101, 78; 422/167

[56] References Cited

U.S. PATENT DOCUMENTS 4,171,250 10/1979 Eddleman .

5,403,382 4/1995 Fairbanks ................ 266/101

FOREIGN PATENT DOCUMENTS 0263539 4/1988 European Pat. Off. .
3227240 2/1983 Germany .

Primary Examiner—Melvyn Andrews
Attorney, Agent, or Firm—Friedrich Kueffner

[57] ABSTRACT

An apparatus for dissolving zinc by means of acid-containing liquid electrolytes includes a container for zinc particles to be dissolved, inlet and outlet devices for continuously admitting and discharging fresh or zinc-enriched electrolytes, and collecting and discharging devices for the gases produced during the dissolution of zinc, such as, hydrogen. The apparatus container for receiving the electrolyte has in its lower portion an intermediate screen floor for placing the zinc particles filling thereon. The inlet devices for the fresh electrolyte are arranged below the intermediate screen floor. An overflow for the zinc-enriched electrolyte is arranged in the upper portion of the container. Filters and catch containers are arranged following the overflow. A gas collecting chamber with discharge device is arranged above the apparatus container.

15 Claims, 2 Drawing Sheets

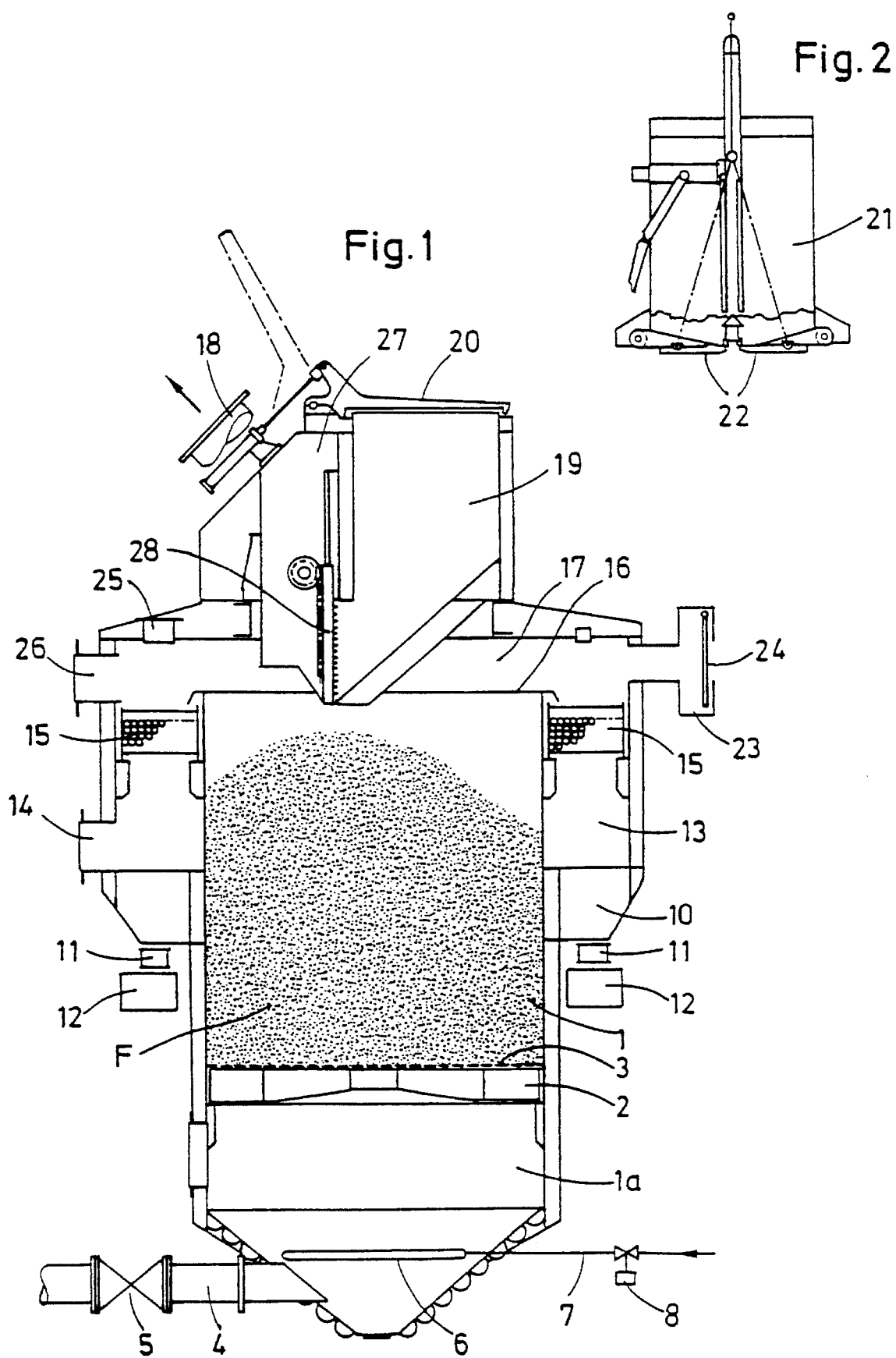

APPARATUS FOR DISSOLVING ZINC BY MEANS OF ACID-CONTAINING LIQUID ELECTROLYTES

BACKGROUND OF THE INVENTION

1. Field of the Invention

The present invention relates to an apparatus for dissolving zinc by means of acid-containing liquid electrolytes. The apparatus includes a container for zinc particles to be dissolved, inlet and outlet devices for continuously admitting and discharging fresh or zinc-enriched electrolytes, and collecting and discharging devices for the gases produced during the dissolution of zinc, such as, hydrogen.

2. Description of the Related Art

Apparatus of the above-described type are already known in the art. In these apparatus, zinc particles are introduced into a container filled with an electrolyte which contains sulfuric acid and the zinc particles are dissolved in the electrolyte. During this dissolving process, the free acid of the electrolyte used in the process is gradually used up, so that it is necessary from time to time to refill with fresh electrolyte. This fresh electrolyte is admitted continuously and the same quantity of electrolyte enriched with dissolved zinc is discharged.

The operation of these known apparatus has several advantages. When the zinc is dissolved, large quantities of hydrogen are produced which cause more or less intense turbulence in the dissolving bath. These turbulences have the result that undissolved particles of the zinc are entrained in the electrolytic liquid which is enriched with dissolved zinc and is being discharged. Also, insoluble dirt particles are being entrained which are also included in the liquid being discharged. Consequently, the electrolytic liquids which are enriched with zinc and are used, for example, for coating metal strips, contaminate the coating to be applied.

Therefore, it has already been proposed to introduce the zinc-enriched electrolytic liquids initially into stilling containers which are to cause a dissolution of the not yet completely dissolved zinc particles and a sedimentation of the dirt particles. However, this manner of operation requires relatively long dwell times in the stilling containers and requires a significantly greater quantity of electrolytic liquid for the circulation. In addition, the stilling containers must be taken out of the circulation for the necessary cleaning, so that a continuous operation cannot be ensured.

SUMMARY OF THE INVENTION

Therefore, it is the primary object of the present invention to improve the known apparatus described above in such a way that, in spite of the discharge of dirt and zinc particles, a continuous operation is made possible and the gases produced in the process are discharged.

In accordance with the present invention, the apparatus container for receiving the electrolyte has in its lower portion an intermediate screen floor for placing the zinc particles filling thereon. The inlet devices for the fresh electrolyte are arranged below the intermediate screen floor. An overflow for the zinc-enriched electrolyte is arranged in the upper portion of the container. Filters and catch containers are arranged following the overflow. A gas collecting chamber with discharge device is arranged above the apparatus container.

The apparatus container may be arranged standing or suspended. The container is filled above the intermediate screen floor with zinc particles; the zinc particles are advantageously in the form of granulates or pellets. Fresh electrolytic liquid is supplied from below through the intermediate screen floor. When the electrolytic liquid flows through the heap of zinc particles, the dissolution process of the zinc takes place and the zinc-enriched electrolytic liquid is conducted over the overflow and through the filters into the discharge and from there into the cycle of the plant arranged downstream for coating.

In accordance with the invention, the undissolved zinc particles and the dirt particles, which are also in this case taken along over the overflow because of the turbulence resulting from the hydrogen production, are held back by filters which are composed of heaps of glass spheres and/or plastic spheres. These heaps are arranged in baskets located above the catch containers. In the case of a cup-shaped cylindrical apparatus container, the catch containers and the baskets may be arranged underneath the upper rim of the apparatus container forming the overflow and in the form of segments or a ring around the outer circumference of the container. The catch containers and the baskets may also be composed of ring chambers placed on a driven revolving support, wherein the ring chambers are successively moved to an emptying station and a filling station for the heap. It is also possible to use a rinsing and cleaning unit for the spheres of the heap arranged between the emptying station and the filling station. The rinsing unit can also be arranged already between the emptying station and the filling station, so that the cleaned spheres can be supplied in the same work step to the filling station.

In accordance with the invention, another possibility is to subject the heaps of the ring chambers in a cleaning position to rinsing means of a rinsing unit. In accordance with the invention, an overflow weir is arranged at the overflow in the area of the rinsing unit.

In the cleaning unit mentioned first, the baskets are slowly moved in a circle and are emptied in the emptying station, for example, by tilting or by means of a suction device, and the baskets are filled with cleaned spheres in the filling station located following the cleaning unit. On the other hand, in the cleaning unit mentioned second, the spheres remain in the ring chambers and are subjected in a fixed cleaning position of its revolving cycle to the rinsing liquid by means of a rinsing unit. In this case, the overflow weir prevents electrolytic liquid from reaching the chamber in this position. A nitrogen supply line may be arranged in addition to the rinsing unit.

In accordance with another feature of the present invention, a measuring head for measuring the hydrogen concentration of the collected gases is arranged in the gas collecting chamber above the apparatus container. The measuring head influences the supply of fresh electrolyte through regulating units and switches off the supply when the concentration is too high. Another nitrogen supply line may be connected to the gas collecting chamber. The gas collecting chamber is additionally equipped with a fresh air supply opening with an inwardly opening rotary flap.

In accordance with another feature of the invention, a lock unit is provided above the container on the gas collecting chamber for a movable container placed on the lock unit for zinc particles to be supplied to the container. Finally, blow nozzles for blowing in nitrogen can be provided in the container underneath the intermediate screen floor. The apparatus container may be placed on pressure measuring units or pickups for monitoring through testing and comparing units the filling level of the container with zinc particles.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic sectional view of the apparatus according to the present invention;

FIG. 2 is a schematic sectional view of a detail of the apparatus of FIG. 1;

DETAILED DESCRIPTION OF THE PREFERRED EMBODIMENTS

Figure 3:
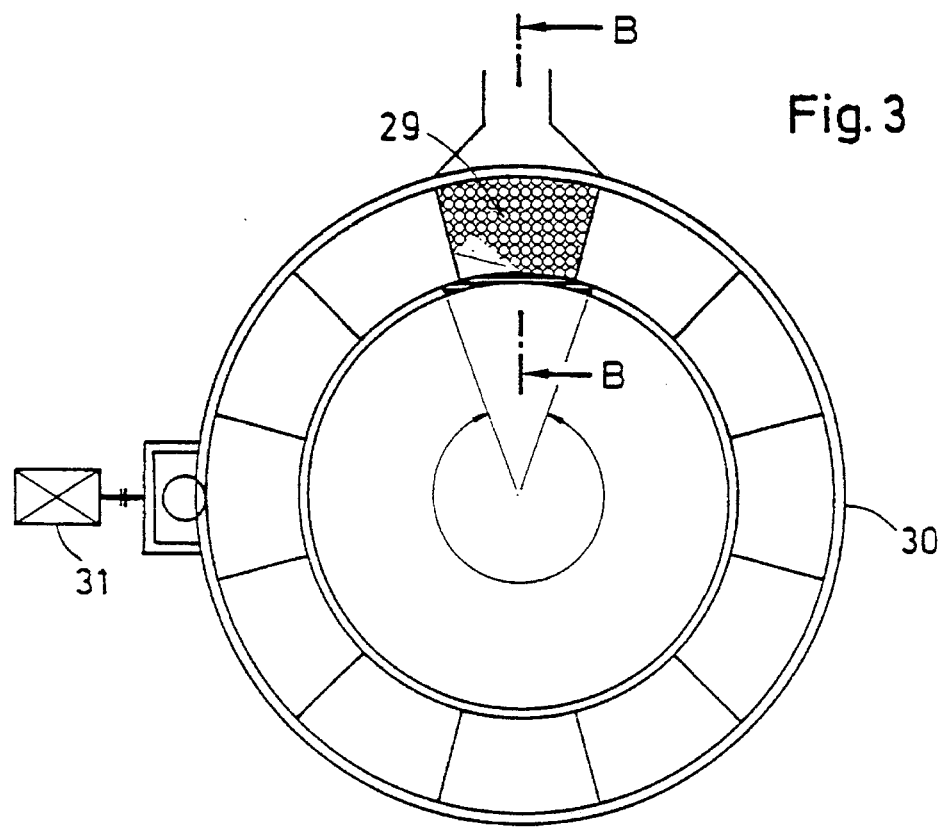
FIG. 3 is a top view of another embodiment of the apparatus according to the present invention.

As illustrated in FIG. 1, the apparatus container 1 is constructed as a cylindrical vessel which is open at the top and is provided in its lower portion with an intermediate floor 2 which extends over the entire internal cross section. A fine-mesh screen 3 is placed on the intermediate floor 2. The intermediate floor 2 and the screen 3 together form an intermediate screen floor 2, 3. A supply pipe 4 for supplying fresh electrolyte is arranged underneath the intermediate screen floor 2, 3 in the lower container portion 1a. The supply pipe 4 is equipped with a motor-driven gate valve 5. Also arranged in the lower container portion 1a is a blow nozzle set 6 with a supply line 7 and gate valves 8 for nitrogen. The filling F of the container 1 consisting of zinc particles is placed on the intermediate screen floor 2, 3.

An annular bracket 10 is mounted on the outer circumference of the container 1. The annular bracket 10 rests on pressure pickups 11 which are supported by stationary support beams 12.

The annular bracket 10 supports an also annular overflow chamber 13 with a discharge 14. Circular segment-shaped removable baskets 15 are arranged above the overflow chamber 13. A heap of glass spheres or plastic spheres is contained in each basket 15. The upper rim of the apparatus container 1 has an angled-off overflow edge 16.

A dome-shaped gas collecting chamber 17 is arranged above the container 1. The gas collecting chamber 17 has in its upper portion a discharge line 18. Further provided in the upper portion of the gas collecting chamber 17 is a lock chamber 19 with a closing flap 20 on which can be placed the filling container 21 shown in FIG. 2.

As shown in FIG. 2, the filling container 21 has emptying flaps 20 at the bottom. The gas collecting chamber 17 additionally has a fresh air supply inlet 23 with a rotary flap 24 and an inlet 25 for the supply of nitrogen. Finally, a safety overflow 26 is provided above the overflow edge 16 of the container 1 within the gas collecting chamber.

An electrolytic liquid with an excess of free acid, for example, sulfuric acid, is supplied to the container 1 through the inlet pipe 4. The electrolytic liquid flows through the intermediate screen floor 2, 3 and the filling F of zinc particles, for example, in the form of granulates or pellets, placed on the floor 2, 3, and starts the dissolution process of the zinc. The electrolytic liquid enriched with zinc ions flows over the overflow edge 16 into the baskets 15 with the heaps of glass spheres or plastic spheres, and from there into the overflow chamber 13. Undissolved zinc particles and insoluble dirt particles are filtered out of the liquid by the heap of spheres and, because of the fact that more electrolytic liquid is supplied to the spheres, the remaining zinc particles are dissolved.

The baskets 15 with the heap of spheres are removed from time to time and the heap is cleaned by rinsing with water or other rinsing liquids. The gas (hydrogen) collected in the gas collecting chamber 17 is suctioned off through the discharge line 18 and, due to the negative pressure produced as a result, fresh air is conducted through the fresh air supply line 23 into the gas collecting chamber 17, wherein the rotary flap 24 opens toward the inside. A measuring head 27 is provided for monitoring the gas concentration in the gas collecting chamber 17. The measuring head 27 influences regulating units, not shown, which, if necessary, stop the further supply of electrolytic liquid through the supply pipe 4 by means of the gate valve 5. During this process, nitrogen can be introduced into the gas collecting chamber 17 through the inlet 25 until the zinc dissolution process has completely ended.

For introducing a new zinc filling, the filling container 21 shown in FIG. 2 filled with fresh zinc particles is placed on the lock chamber 19 after the closing flap 20 of the lock chamber 19 has been moved into the position shown in dash-dot lines; during this procedure the lock slide member 28 is closed. By opening the emptying flaps 22, the filling is introduced into the lock chamber 19. After lifting the empty filling container 21, the closing flap 20 is closed and the lock slide member 28 is opened, so that the filling is introduced into the container 1.

For monitoring the filling F in the container 1, the weight of the container 1 is determined by the pressure measuring units or pickups 11 and is monitored by testing and comparing units, not shown.

The filling F can be loosened from time to time by blowing in nitrogen through the blow nozzle set 6.

Figure 4:
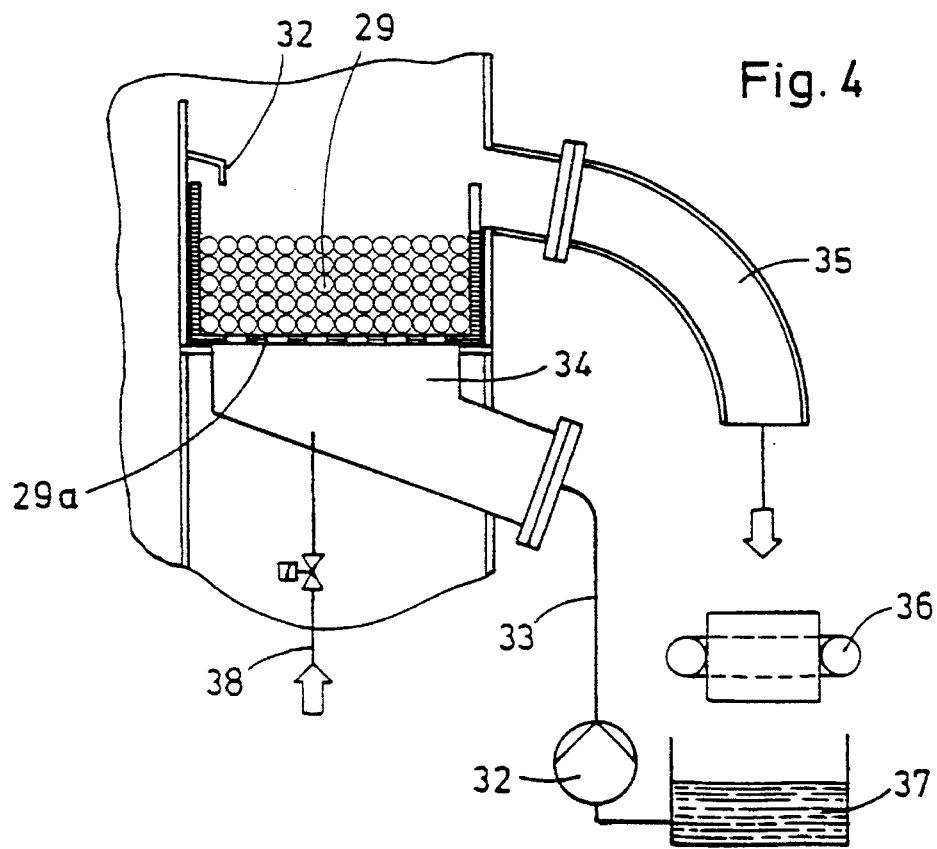
FIG. 4 is a sectional view taken along sectional line B—B of FIG. 3.

In the embodiment illustrated in FIG. 3, ring chambers 29 are provided instead of the baskets. The ring chambers 29 are jointly mounted on a revolving support 30 and, as shown in FIG. 4, the ring chambers 29 are provided with screen floors 29a. The ring chambers 29 are driven by a motor 31 and are successively moved into the cleaning position, shown in FIG. 4, in which an overflow weir 32 prevents the overflow of electrolytic liquid into the ring chamber 29. A rinsing liquid is introduced into the rinsing chamber 34 by means of the pump 32 and through a supply line 33. From the rinsing chamber 34, the rinsing liquid is passed through the screen floor 29a into the ring chamber 29 and the heap of spheres in the ring chamber 29. The rinsing liquid containing dirt is then conducted through the outlet 35 and a gravity filter 36 into tank 37. The effect of the heap of spheres can be improved by means of a nitrogen supply unit 38.

The invention is not limited by the embodiments described above which are presented as examples only but can be modified in various ways within the scope of protection defined by the appended patent claims.

We claim:

1. An apparatus for dissolving zinc by means of acid-containing liquid electrolytes, the apparatus comprising an apparatus container for receiving zinc particles to be dissolved, the apparatus container having an upper portion, a lower portion and an interior, an intermediate screen floor for receiving the zinc particles thereon being mounted in the interior and the lower portion of the apparatus container, the apparatus container having a supply device below the intermediate screen floor for introducing fresh electrolyte into the interior of the apparatus container, the apparatus container having an overflow in the upper portion of the apparatus container for discharging zinc-enriched electrolytes, filters being mounted downstream of the overflow and catch containers being mounted following the filters, further comprising a gas collecting chamber mounted above the catch containers, the gas collecting chamber having a gas discharge device.

2. The apparatus according to claim 1, wherein the filters are comprised of heaps of glass or plastic spheres.

3. The apparatus according to claim 2, comprising baskets mounted above the catch containers, the spheres being contained in the baskets.

4. The apparatus according to claim 3, wherein the apparatus container is cylindrically cup-shaped, the apparatus container having an upper rim, the upper rim forming the overflow, the apparatus container having an outer circumference, the catch containers and baskets being ring segment-shaped and being mounted around the outer circumference of the apparatus container and below the upper rim.

5. The apparatus according to claim 4, wherein the ring chambers have screen floors, a revolving support being mounted around the outer circumference of the apparatus container, further comprising an emptying station and a filling station for spheres, such that the ring chambers can be moved successively on the revolving support to the emptying station and then to the filling station.

6. The apparatus according to claim 5, comprising a cleaning and rinsing device for the spheres, the cleaning and rinsing device being mounted between the emptying station and the filling station.

7. The apparatus according to claim 5, comprising a rinsing unit for supplying rinsing liquid to the spheres in the ring chambers in a cleaning position.

8. The apparatus according to claim 7, comprising an overflow weir at the overflow mounted in the cleaning position for preventing electrolyte from overflowing into the ring chamber.

9. The apparatus according to claim 7, comprising a nitrogen supply line for supplying nitrogen to the cleaning position.

10. The apparatus according to claim 1, comprising a measuring head mounted in the gas collecting chamber for measuring the concentration of gas collected in the gas collecting chamber, and regulating units connected to the measuring head for controlling the supply of fresh electrolyte.

11. The apparatus according to claim 1, comprising a nitrogen supply line extending into the gas collecting chamber.

12. The apparatus according to claim 10, wherein the gas collecting chamber comprises a fresh air inlet, the fresh air inlet being closed by an inwardly opening rotary flap.

13. The apparatus according to claim 1, comprising a lock unit mounted above the apparatus container on the gas collecting chamber, and a movable filling container placed on the lock unit for supplying zinc particles.

14. The apparatus according to claim 1, wherein the apparatus container comprises a set of blow nozzles for blowing nitrogen into the interior of the apparatus container, the set of blow nozzles being mounted below the intermediate screen floor.

15. The apparatus according to claim 1, further comprising pressure measuring means, the apparatus container being placed on the pressure measuring means, testing and comparing units being connected to the pressure measuring means for monitoring a filling level of zinc particles in the apparatus container.

\* \* \* \* \*